Sept. 4, 1945.　　　　R. E. SOMERS　　　2,384,403
STUD
Filed Feb. 8, 1943

Inventor
Robert E. Somers.
By R. S. G. Dougherty.
Attorney

Patented Sept. 4, 1945

2,384,403

UNITED STATES PATENT OFFICE 2,384,403

STUD

Robert E. Somers, Hellertown, Pa., assignor to Bethlehem Steel Company, a corporation of Pennsylvania Application February 8, 1943, Serial No. 475,131

4 Claims. (Cl. 85—1)

My invention relates to welding, and more particularly to the electric end welding of stud bolts and the like to metal members such as steel plates.

It is well known that end welding a bare stud to plating has resulted in comparatively weak and brittle welds. This was due to the deleterious action of the air on the molten metal. Fluxes were placed on the plate to eliminate this condition but as the weld metal of the stud had to travel the length of the arc subject to the effects of the air before fluxing action was started, the welds were not much improved. In many cases the studs were inserted through a hole in a wooden sheathing on the plate, and this sheathing would catch fire or char, and thus be badly damaged. The present invention provides means to overcome these difficulties.

One of the objects of my invention is to provide a stud with a flux coated welding end.

Another object of my invention is to provide an end-coated stud or rod which is particularly adapted to be welded to a steel surface, the coating on the stud constituting fire protection for inflammable material when said material is adjacent to the weld.

Figure 1:
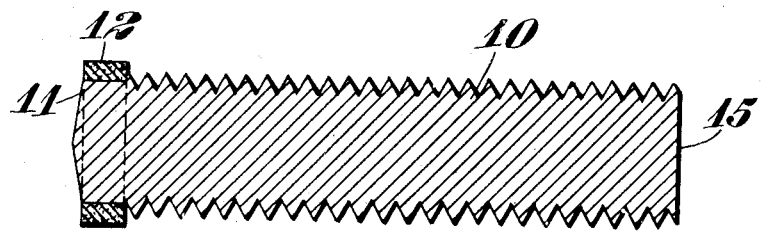
Figure 2:
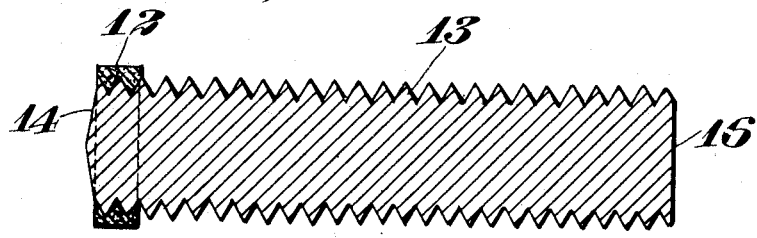

Other objects and advantages will be more fully understood upon reference to the specification and drawing, in which:

Figure 1 is a side view of my improved end coated stud with the coating in section, and Figure 2 is a side view of a standard end coated stud with the coating in section.

In electric end welding a stud to a steel surface such as a deck or other plate, the stud comprises one terminal of the welding circuit and the plate comprises the other terminal. An arc is struck between the stud and the plate and is held until both reach the proper temperature whereupon the stud is shorted to the plate, the current shut off, and the weld is completed.

As shown in Figure 1 of the drawing my invention comprises a stud 10 having its welding end 11 coated by dipping, extrusion or other process with a flux 12 similar in form and composition to that used to coat standard welding electrodes. It will be seen that the end 11 of the stud 10 shown in Figure 1 is not threaded but has a smooth surface. This is my preferred form as it can be coated uniformly with flux. However, the standard threaded stud 13 when coated on its end 14 with flux 12 as shown in Figure 2 can be welded effectively, and therefore comes within the scope of my invention.

In welding the stud of my invention to a plate, the current receiving end 15 or 16 of the stud 10 or 13 opposite the coated end 11 or 14 respectively is placed in a holder (not shown) which is connected to one conductor of the electric welding current. The plate is connected to the other conductor. The coated end of the stud is then held in spaced relation to the plate at the place where the stud is to be welded.

The arc is struck and as the rod is melted, the flux is consumed supplying a continuous shield of inert material which completley excludes the air from the vicinity of the arc and weld. As the flux coating is more readily ionizable than iron, the arc is easily initiated and due to the refractory nature of the flux coating its effect is to stabilize and direct the arc to one area.

While I have shown my invention in a plurality of forms, it will be obvious to those skilled in the art that it is not so limited, but is susceptible of various changes and modifications without departing from the spirit thereof, and I desire, therefore, that only such limitations shall be placed thereupon as are specifically set forth in the appended claims.

Having thus described my invention what I claim as new and desire to secure by Letters Patent is:

1. A stud adapted to be end welded comprising a body portion, a current receiving end portion, a welding end portion, and a flux coating on said body portion adjacent said welding end portion.

2. A threaded stud adapted to be end welded comprising a body portion, a current receiving end and a welding end, said body portion adjacent the welding end having a portion of its surface coated with welding flux.

3. A stud adapted to be end welded comprising a body portion, a threaded current receiving end and a welding end, said body portion adjacent the welding end having a portion of its surface coated with welding flux.

4. A stud adapted to be end welded comprising a body portion, a threaded current receiving end, and an unthreaded welding end, said body portion adjacent the welding end having a portion of its surface coated with welding flux.

ROBERT E. SOMERS.